United States Patent Office 3,210,244
Patented Oct. 5, 1965

3,210,244
METHOD FOR CONTROLLING INSECTS WITH ORGANOPHOSPHORUS COMPOUNDS
John Henry Wilson, Jr., Richmond, Va., assignor to Socony Mobil Oil Company, Inc., a corporation of New York
No Drawing. Filed June 5, 1962, Ser. No. 200,068
2 Claims. (Cl. 167—22)

This invention relates to organophosphorus compounds which have utility as insecticides. More particularly the invention relates to a group of compounds defined by the formula $$(RS)_2P(S)OCH_3$$

wherein R is an alkyl group containing from 2 to 4 carbon atoms, inclusive. The compounds coming within this formula are referred to as S,S-dialkyl O-methyl phosphorotrithioates, and, as shown by the definition of R, this disclosure will be concerned only with those phosphorotrithioates wherein the alkyl portion is ethyl, propyl or butyl.

These compounds may be prepared substantially according to the following scheme:

(1) $\quad 2RSH + PX_3 \rightarrow (RS)_2PX + 2HX$
(2) $\quad (RS)_2PX + CH_3OH \rightarrow (RS)_2POCH_3 + HX$
(3) $\quad (RS)_2POCH_3 + S \rightarrow (RS)_2P(S)OCH_3$ Reaction (1) can be carried out by any conventional means. As an example, approximately 2 moles of the appropriate alkyl mercaptan is added to 1 mole of a phosphorus trihalide, such as PCl$_3$, at a temperature of about 25–30° C., and the (RS)$_2$PCl thus produced is recovered by fractional distillation. Reaction (2) may be effected by reacting the product from (1) with methyl alcohol in the presence of an inert organic solvent and an acceptor for the liberated halogen acid. An organic tertiary amine is preferably used as the acid acceptor, and any such amine is acceptable provided that it has sufficient basicity to accept the acid. Examples of suitable amines are the trialkyl amines (particularly those containing from 1 to about 6 or 8 carbons in each alkyl group), pyridine and the like. After reaction and separation of the product from (2), the product of reaction (3) may be obtained by reacting the dithioite from (2) with elemental sulfur or other sulfurizing agent. If elemental sulfur is used, the sulfur and dithioite may be placed together and the reaction temperature maintained at about 100° C. until the reaction is complete. Alternatively, the sulfur may be added portionwise to the dithioite while maintaining the 100° C. temperature until complete reaction occurs. Normally, the reaction is over when solid sulfur is no longer to be seen in the reaction mixture.

The phosphorus organic compounds of the invention are useful as insecticides at very low concentrations. Because of the low rates required for effective control, it is generally impracticable to apply the compounds as such. It is desirable, therefore, to apply them in the form of liquid formulations, or in combination with other vehicles or extenders comprising a minor, insecticidal amount of the active compound. For example, the compounds may be mixed with a dust or any convenient finely divided solid carrier which will aid in the uniform distribution of the chemicals. As a general rule, solid carriers which are acceptable are those which are nonhygroscopic, thereby preventing the compositions from caking. Some of the useful solid carriers are finely divided kaolonite, bentonite, flour, talc, attapulgite, and the like.

When making a dust formulation, a more even distribution of the chemical in the solid may be obtained if the chemical is first dissolved in a volatile organic solvent prior to mixing. After mixing, the solvent is evaporated by any convenient means. Any solvent in which the chemical is soluble and which may be readily removed by evaporation or other means is acceptable.

Liquid compositions may be dispersions or emulsions. Since the compounds of this invention are substantially water insoluble, it is desirable to add a small amount of an inert, non-phytotoxic organic solvent which can be readily admixed with the aqueous medium to produce a uniform dispersion of the active component. An effective liquid formulation includes the active component, acetone, water and at least about 1%, based on the active component, of a surface active agent such as Tween 20 (polyoxyethylene sorbitan monolaurate). Included among the other useful agents which the art recognizes are Atlox G–3396 and Atlox G–2081, which are, respectively, a blend of polyoxyethylene sorbitol esters of mixed fatty and resin acids and alkyl aryl sulfonates, and a blend of polyoxyethylene sorbitan esters of fatty and resin acids and alkyl aryl sulfonates.

When treating for insects, it is necessary only to apply sufficient of the material to assure contact with the pests. For example, when treating plants infested with insects, control can be achieved by dusting in the manner as for other materials, or by spraying a liquid formulation just to the point of liquid run-off. Soil-borne insects may be treated in known ways.

EXAMPLE 1

This example will specifically illustrate a process for making the compounds.

(a) *S,S-dipropyl phosphorochloridodithioite*

Six hundred and seven parts (by weight here and throughout) (8 moles) of propyl mercaptan was added to 550 parts (4 moles) of PCl$_3$ at 25–30° C. in one hour and 55 minutes, after which the mixture was allowed to stand overnight. The product was separated from the mixture by fractionally distilling at 5 mm. of mercury up to a boiling point of 140° C.

(b) *S,S-dipropyl O-methyl phosphorodithioite*

Fifty-four parts of the product from (a) was added at 0–5° C. over a period of 30 minutes to a mixture of 12 parts of methanol and 38 parts of triethylamine in hexane. The reaction mixture was stirred at 0–5° C. for an additional hour. The reaction mass was warmed and filtered to remove the amine hydrochloride. An atmosphere of N$_2$ was maintained during the reaction, stirring, and filtration to prevent oxidation. After filtration, the hexane was fractionated, first at atmospheric pressure, then to 30 mm. at a final pot temperature of 100° C. The residue was distilled at 10 mm. of mercury to yield the product boiling at 130–140° C.

(c) *S,S-dipropyl O-methyl phosphorotrithioate*

Twenty-one parts of the compound from (b) was mixed with 3.2 parts of elemental sulfur. While maintaining an atmosphere of N$_2$ over the mixture, it was heated to 50° C., at which point an exothermic reaction began. The temperature reached a maximum of about 100° C., and the temperature was maintained at this point until the reaction was complete. The reaction was considered complete when sulfur was no longer visible in the mixture. Distillation at 99–105° C. at 0.15 mm. gave 21 parts (86%) of the product.

EXAMPLE 2

This example illustrates the effectiveness of the disclosed compounds as insecticides. It is to be understood that the example is illustrative only, and the invention is not limited thereto.

Solutions were prepared from acetone and S,S-dipropyl O-methyl phosphorotrithioate so that one ml. of a particular concentration contained 8, 4, 2, or 1 mg. of active ingredient.

Three grams of whole wheat flour was placed in each of twelve 20 x 90 mm. petri dishes. The dishes were divided into four groups. One ml. of solution containing 8 mg. of active ingredient was placed in the flour in each of the first group of dishes. One ml. of solution was placed in each dish of the other three groups in the same manner, each ml. containing 4, 2, or 1 mg. of active component, respectively. The flour and active ingredient were mixed thoroughly, and about 2 hours was allowed for complete evaporation of the acetone. The flour and compound were gathered to one side of the dish. Adult confused flour beetles, *Tribolium confusum*, were placed in the flour and the dish was covered with cheese cloth. There was a 100% mortality of the beetles after 48 hours at all concentrations.

It is to be understood that Example 2 illustrates the use of the compounds within the preferred range of about 0.01% to 0.3% of the active ingredient in the formulation. The invention, however, is not to be unnecessarily limited to this range. Although the total range of effectiveness is not at presently known, it is contemplated that less than 0.01% will be effective. Furthermore, even though substantially complete control is achieved at the higher rate, thus making it impracticable to apply a higher concentration in most instances, higher rates may be necessary. A higher concentration of compound may be needed, for example, where there are adverse weather conditions or where there are resistant insects. With reference to the maximum concentration, it is believed that the only limiting factor will be plant injury, or more precisely, the concentration at which plant injury becomes a critical factor.

As used herein, the term "insecticide" will be understood to include the use of the chemicals for protection against true insects as well as spiders, mites, ticks and similar pests which are not, biologically speaking, insects.

I claim:

1. A method of controlling insects which comprises applying thereto an insecticidal amount of a compound of the formula $$(RS)_2P(S)OCH_3$$

wherein R is alkyl having from 2 to 4 carbons.

2. The method of claim 1 in which the compound is $(C_3H_7S)_2P(S)OCH_3$.

References Cited by the Examiner

UNITED STATES PATENTS

| | | | |
|---|---|---|---|
| 2,063,629 | 12/36 | Salzberg et al. | 260—461 |
| 2,769,831 | 11/56 | Scott | 260—461 |
| 2,861,023 | 11/58 | Scott et al. | 167—22 |
| 2,967,884 | 1/61 | Dunn et al. | 260—486 |
| 3,112,244 | 11/63 | Goyette | 167—22 |

JULIAN S. LEVITT, *Primary Examiner.*

LEWIS GOTTS, *Examiner.*